United States Patent
Yin et al.

(10) Patent No.: US 12,501,105 B2
(45) Date of Patent: Dec. 16, 2025

(54) CONTENT COLLABORATION METHOD AND ELECTRONIC DEVICE

(71) Applicant: GUANGDONG OPPO MOBILE TELECOMMUNICATIONS CORP., LTD., Dongguan (CN)

(72) Inventors: Kairong Yin, Dongguan (CN); Piaoyu Sun, Dongguan (CN); Lei Bao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 14 days.

(21) Appl. No.: 18/512,178

(22) Filed: Nov. 17, 2023

(65) Prior Publication Data
US 2024/0089529 A1 Mar. 14, 2024

Related U.S. Application Data

(63) Continuation of application No. PCT/CN2022/080705, filed on Mar. 14, 2022.

(30) Foreign Application Priority Data

May 20, 2021 (CN) .......................... 202110553837.9

(51) Int. Cl.
H04N 7/01 (2006.01)
H04N 21/4363 (2011.01)
H04N 21/472 (2011.01)

(52) U.S. Cl.
CPC ..... *H04N 21/43637* (2013.01); *H04N 21/472* (2013.01)

(58) Field of Classification Search
CPC ............ H04N 21/43637; H04N 21/472; H04L 67/06; H04L 67/104; H04L 67/1095; H04W 4/80
See application file for complete search history.

(56) References Cited

U.S. PATENT DOCUMENTS 6,269,389 B1    7/2001  Ashe
7,404,201 B2 *  7/2008  Takeuchi ........... H04N 7/17336
                                                    725/86

(Continued)

FOREIGN PATENT DOCUMENTS

CN    105700846 A    6/2016
CN    106332312 A    1/2017

(Continued)

OTHER PUBLICATIONS

WIPO, International Search Report for PCT Application No. PCT/CN2022/080705, Jun. 1, 2022.

(Continued)

*Primary Examiner* — Gigi L Dubasky
(74) *Attorney, Agent, or Firm* — Sheppard, Mullin, Richter & Hampton LLP

(57) ABSTRACT

Provided are a content collaboration method, and an electronic device. A first electronic device is connected with a second electronic device through short-range wireless communication. The first electronic device receives a target message transmitted from the second electronic device, where the target message is transmitted by the second electronic device in response to detecting that target content is newly added to a target storage area of the second electronic device, and the target message carries the target content. A notification for the target message is displayed on the first electronic device, where the notification is used to prompt for an operation of processing the target content on the first electronic device.

18 Claims, 11 Drawing Sheets

(56) References Cited

U.S. PATENT DOCUMENTS

| | | |
|---|---|---|
| 9,113,195 B1 | 8/2015 | Barton |
| 2009/0144368 A1 | 6/2009 | Andersen |
| 2010/0174804 A1* | 7/2010 | Sonoyama .......... H04L 67/1095 |
| | | 709/224 |
| 2018/0020259 A1* | 1/2018 | Kim ..................... H04N 21/472 |
| 2018/0234496 A1* | 8/2018 | Ratias .................. H04L 67/535 |
| 2018/0275948 A1* | 9/2018 | Xu ........................ G06F 3/1454 |
| 2019/0377536 A1 | 12/2019 | Wang |
| 2022/0070971 A1* | 3/2022 | Wang ................... H04W 48/08 |
| 2022/0217108 A1* | 7/2022 | He ........................ G06F 3/0484 |
| 2023/0050949 A1* | 2/2023 | Mo ........................ H04L 67/50 |

FOREIGN PATENT DOCUMENTS

| | | |
|---|---|---|
| CN | 107085508 A | 8/2017 |
| CN | 110581919 A | 12/2019 |
| CN | 110908625 A | 3/2020 |
| CN | 110943959 A | 3/2020 |
| CN | 111158543 A | 5/2020 |
| CN | 112463418 A | 3/2021 |
| CN | 112527221 A | 3/2021 |
| WO | 2019071872 A1 | 4/2019 |
| WO | 2021052147 A1 | 3/2021 |

OTHER PUBLICATIONS

CNIPA, First Office Action for CN Application No. 202110553837. 9, Feb. 24, 2022.
CNIPA, Office Action issued for CN Application No. 202110553837. 9, Jun. 27, 2022.

\* cited by examiner receiving a target message transmitted from the second electronic device, where the target message is transmitted by the second electronic device in response to detecting that target content is newly added to a target storage area of the second electronic device, and the target message carries the target content  /S710 displaying first prompt information for the clipboard content on the first electronic device, where the first prompt information is used to prompt that a clipboard of the first electronic device has synchronized the clipboard content  /S720

FIG. 16

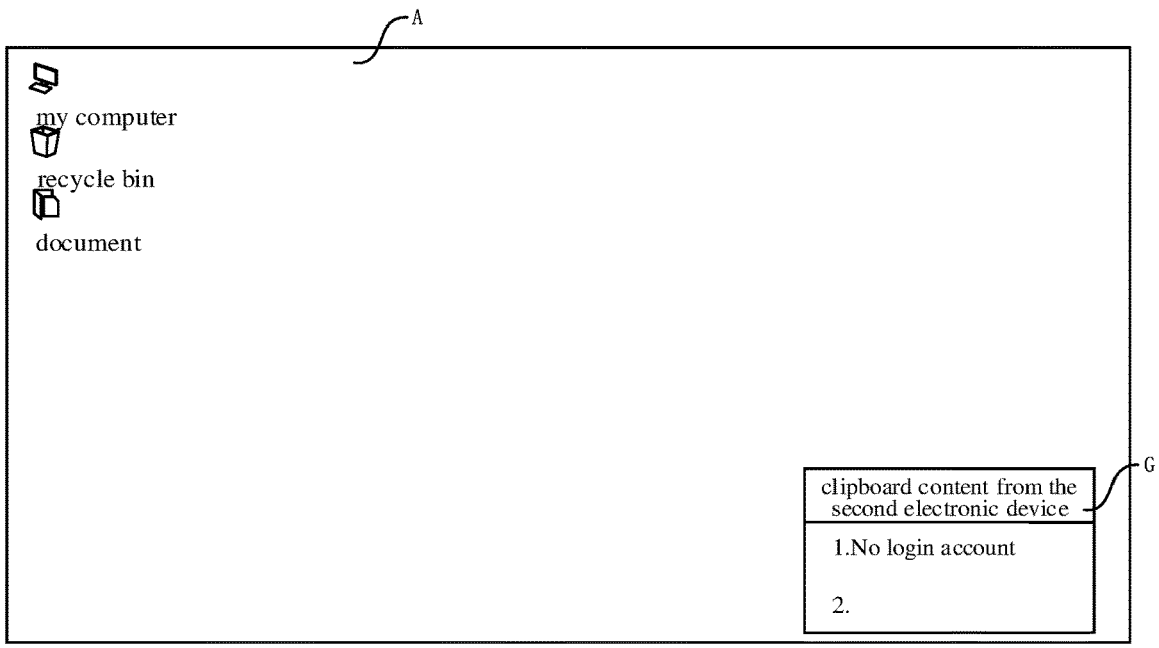

FIG. 17 in response to detecting that target content is newly added to a target storage area of the second electronic device, generating a target message carrying the target content  /S810 transmitting the target message to the first electronic device, to instruct the first electronic device to display a notification for the target message, where the notification is used to prompt for an operation of processing the target content on the first electronic device  /S820

FIG. 18

CONTENT COLLABORATION METHOD AND ELECTRONIC DEVICE

CROSS-REFERENCE TO RELATED APPLICATIONS

This application is a continuation of International Application No. PCT/CN2022/080705, filed Mar. 14, 2022, which claims priority to Chinese patent application No. 202110553837.9, filed on May 20, 2021, both of which are herein incorporated by reference in their entireties.

TECHNICAL FIELD

The disclosure relates to the field of electronic devices, and particularly to a content collaboration method, and an electronic device.

BACKGROUND

With development of science and technology, electronic devices are widely used and have more and more functions. The electronic devices have become one of the necessities in people's daily lives. At present, content synchronization can be realized between two electronic devices.

SUMMARY

Embodiments of the disclosure provide a content collaboration method and an electronic device.

In an aspect, the embodiments of the disclosure provide a content collaboration method implemented by a first electronic device. The first electronic device is connected with a second electronic device through short-range wireless communication. The method includes: receiving a target message transmitted from the second electronic device, where the target message is transmitted by the second electronic device in response to detecting that target content is newly added to a target storage area of the second electronic device, and the target message carries the target content; and displaying a notification for the target message on the first electronic device, where the notification is used to prompt for an operation of processing the target content on the first electronic device.

In another aspect, the embodiments of the disclosure provide a content collaboration method implemented by a second electronic device. The second electronic device is connected with a first electronic device through short-range wireless communication. The method includes: generating a target message carrying target content, in response to detecting that the target content is newly added to a target storage area of the second electronic device; and transmitting the target message to the first electronic device, to instruct the first electronic device to display a notification for the target message, where the notification is used to prompt for an operation of processing the target content on the first electronic device.

In yet another aspect, the embodiments of the disclosure further provide an electronic device. The electronic device includes a memory and a processor. The memory is coupled to the processor, and the memory stores instructions which, when executed by the processor, cause the processor to implement the above method. In some implementations, the electronic device is connected with another electronic device through short-range wireless communication, and the method includes operations as follows. A target message is received, where the target message is transmitted by the another electronic device in response to detecting that there is new content in a target storage area of the another electronic device, and the target message carries the new content. A notification is displayed on the electronic device, where the notification is used to prompt for an operation of processing the new content on the electronic device.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly illustrate technical solutions in the embodiments of the disclosure, drawings to be used in the embodiments are briefly described below. Apparently, the following drawings are merely some embodiments of the disclosure, and those skilled in the art can obtain other drawings according to these drawings without paying any creative effort.

FIG. 16 is a flowchart of the content collaboration method according to still yet another embodiment of the disclosure.

FIG. 17 is a schematic diagram illustrating a ninth interface of the first electronic device according to the embodiments of the disclosure.

FIG. 18 is a flowchart of the content collaboration method according to still yet another embodiment of the disclosure.

DETAILED DESCRIPTION OF PREFERRED EMBODIMENTS

In order to make those skilled in the art better understand the technical schemes of the disclosure, the technical schemes in the embodiments of the disclosure will be described clearly and comprehensively with reference to the drawings in the embodiments of the disclosure.

Friends and family members may often share funny videos, pictures, games, etc., therebetween through two electronic devices. The sharing method may require a data cable or a third-party application to transfer the shared content, which is inefficient and needs complicated operation. It is illustrated by taking a case where one of the two electronic devices is a smart phone and the other is a smart computer as an example. When the content of the smart phone is required to be synchronized to the smart computer, it is necessary to connect the smart phone and the smart computer via the data cable to synchronize the content; alternatively, it is necessary to install a third-party application on both the smart phone and the smart to synchronize the content through the third-party application, all of which are inefficient and complicated to operate.

In view of the above mentioned problems, the inventors proposed, through long-term research, a content collaboration method, a content collaboration apparatus, an electronic device, and a storage medium according to the embodiments of the disclosure. It enables content systems of two electronic devices to be communicated with each other, and newly added content on one of the electronic devices can be synchronized in real-time to the other electronic device, so that a user can conveniently acquire the newly added content on the other electronic device, thereby improving the efficiency of processing the content across terminals. The content collaboration method is described in detail in the subsequent embodiments.

An application environment in which the content collaboration method according to the embodiments of the disclosure is applicable is described as follows.

Figure 1:
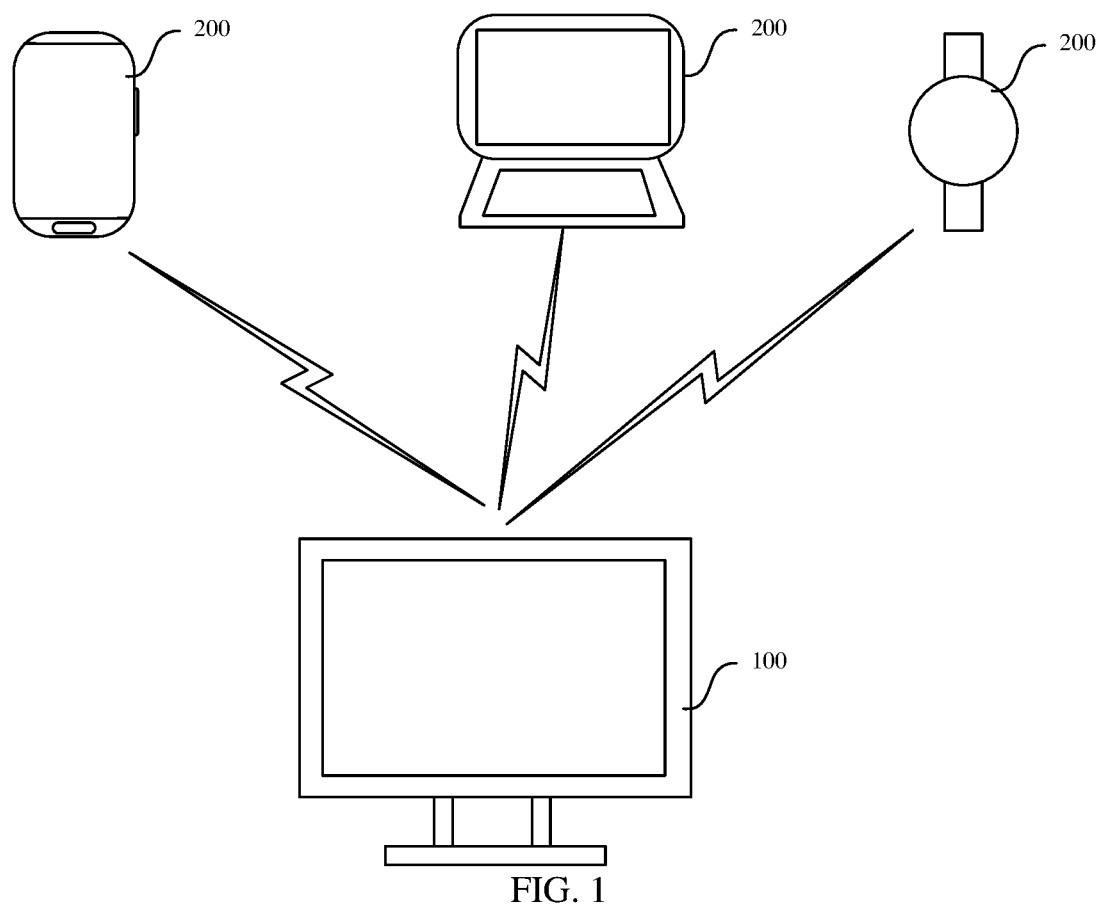
FIG. 1 is a schematic diagram illustrating an application environment in which a content collaboration method according to the embodiments of the disclosure is applicable.

Referring to FIG. 1, FIG. 1 is a schematic diagram illustrating the application environment in which the content collaboration method according to the embodiments of the disclosure is applicable. As illustrated in FIG. 1, the application environment may include a first electronic device 100 and a second electronic device 200. The first electronic device 100 may be a computer illustrated in FIG. 1. Of course, the first electronic device 100 may alternatively be other devices with a display function, such as, a smart TV or a tablet computer, which is not limited herein. The second electronic device 200 may be a device such as a smart phone, a tablet computer, or a smart watch. In this application scenario, the second electronic device 200 may be used as a device for providing a display interface, and the display interface may be displayed on the first electronic device 100 through screen projection. The second electronic device 200 may be used as a device for providing content, and synchronize the content to the first electronic device for processing. For example, the second electronic device 200 may transmit audio content to the first electronic device 100 for playback, and transmit a file to the first electronic device 100 for display, which is not limited herein.

In some implementations, the first electronic device 100 and the second electronic device 200 may communicate to realize data interaction. For example, an end-to-end network connection (i.e., a P2P network connection) may be established between the first electronic device 100 and the second electronic device 200, through a communication mode such as Bluetooth, Zigbee, WebRTC, Wi-Fi direct. The first electronic device 100 and the second electronic device 200 may communicate through the established network connection. In some implementations, the first electronic device 100 and the second electronic device 200 may establish a connection through a wireless screen projection protocol, and transmit data through WLAN. Of course, the communication mode between the first electronic device 100 and the second electronic device 200 may not be limited herein.

In some scenarios, the first electronic device 100 may be a large-screen device (such as a smart computer illustrated in FIG. 1), and a user may make the display interface of a small-screen device, such as the smart phone, the tablet computer, or the smart watch, be displayed, through screen projection, at the large-screen device, thereby improving the user experience in viewing the display interface. In addition, the first electronic device 100 may further operate the display interface projected by the second electronic device 200, to process the display interface projected from the second electronic device 200. For example, the first electronic device 100 may further open a file in the display interface projected from the second electronic device 200, to edit and save the opened file.

In some scenarios, content may be synchronized between the first electronic device 100 and the second electronic device 200, so as to process the content cross-terminal.

Figure 2:
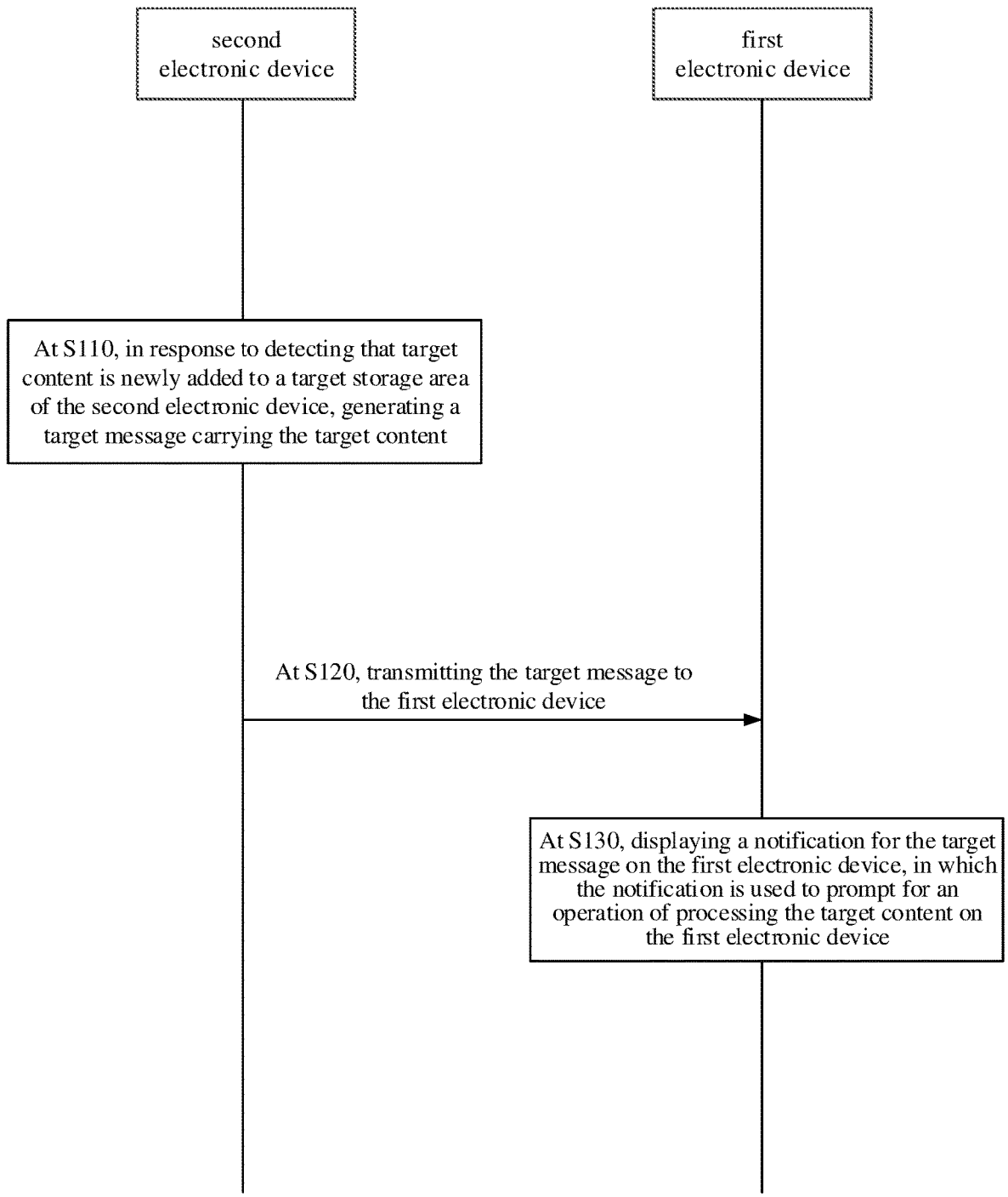
FIG. 2 is a sequence diagram of the content collaboration method according to the embodiments of the disclosure.

Referring to FIG. 2, FIG. 2 is a sequence diagram of the content collaboration method according to the embodiments of the disclosure. The method is applied in a content collaboration system including a first electronic device and a second electronic device. Details for the process illustrated in FIG. 2 will be described below. In the embodiments, the first electronic device and the second electronic device are connected through short-range wireless communication. The content collaboration method may specifically include operations as follows.

At S110, in response to detecting that target content is newly added to a target storage area of the second electronic device, the second electronic device generates a target message carrying the target content.

In the embodiments, the first electronic device is connected with the second electronic device through the short-range wireless communication. For example, Wi-Fi direct may be established between the first electronic device and the second electronic device through a cross-screen interconnection software. After a connection for screen projection is established between the first electronic device and the second electronic device, the second electronic device may transmit screen projection data to the first electronic device. The screen projection data includes a real-time video stream, i.e., the screen projection data includes a display interface of the second electronic device. When the display interface is a desktop interface, the screen projection data is the desktop interface of the second electronic device. When the display interface is an application page, the screen projection data is the application page of the second electronic device. Of course, when the display interface of the second electronic device changes, the screen projection data may change accordingly. In some implementations, the first electronic device may generate a collaborative window on the screen of the first electronic device, based on the screen projection data transmitted from the second electronic device. The collaborative window is used to display a screen projection interface that the second electronic device projects onto the first electronic device, that is, the collaborative window is used to display the display interface of the second electronic device.

Figure 3:
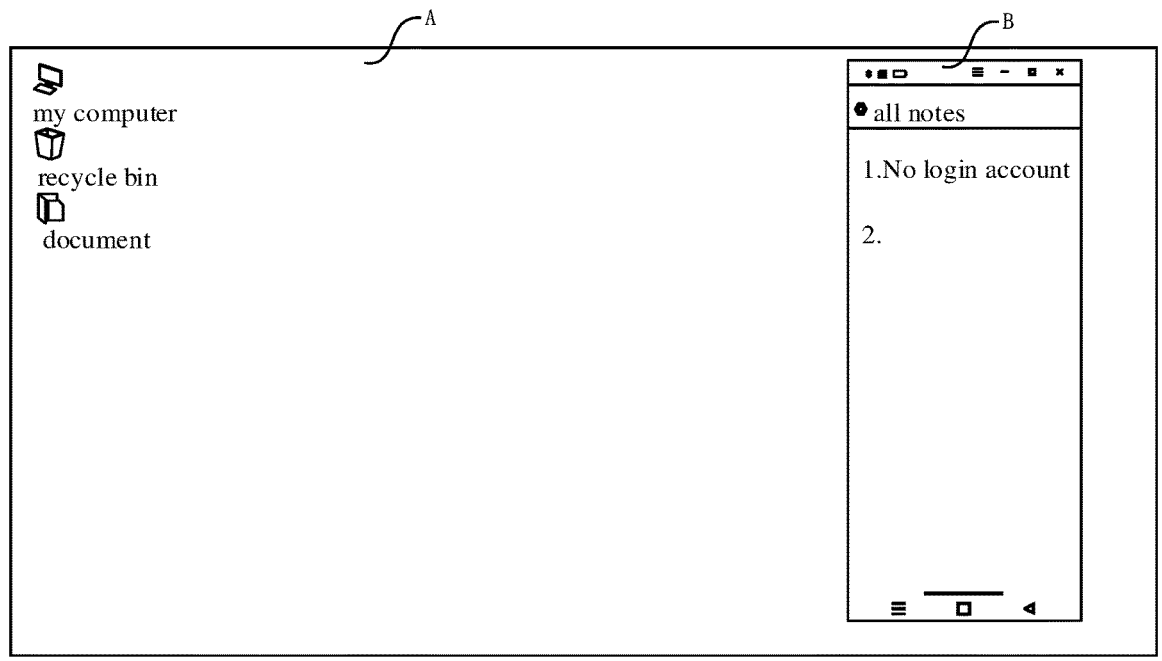
FIG. 3 is a schematic diagram illustrating a first interface of a first electronic device according to the embodiments of the disclosure.

Referring to FIG. 3, FIG. 3 is a schematic diagram illustrating a first interface of a first electronic device according to the embodiments of the disclosure. As illustrated in FIG. 3, the first electronic device is a smart computer, and the second electronic device is a smart phone. The display interface B of the second electronic device is displayed, through screen projection, on an interface A of the first electronic device. The display interface B of the second electronic device may be displayed, through screen projection, on the interface A of the first electronic device at a fixed position (immovable); alternatively, the display interface B of the second electronic device may be displayed, through screen projection, on the interface A of the first electronic device at a dynamic position (movable).

In some implementations, the first electronic device may hide the display interface of the second electronic device, during a process that the first electronic device displays, through screen projection, the display interface of the second electronic device. For example, the display interface of the second electronic device may be hidden by minimizing the display interface.

Figure 4:
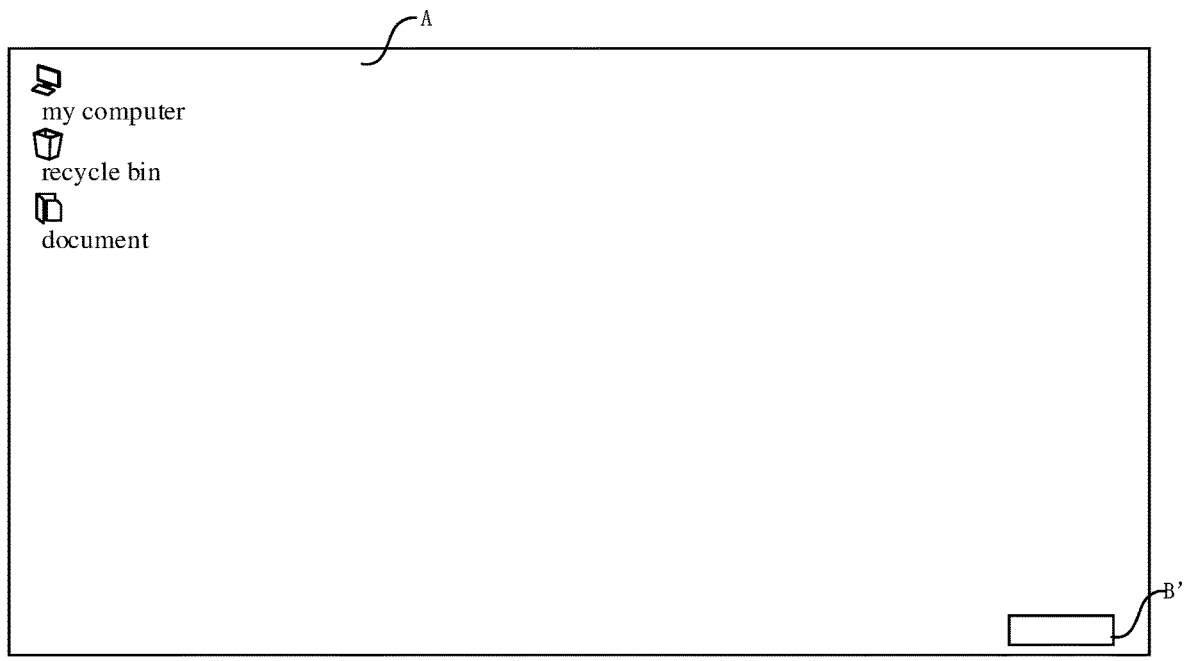
FIG. 4 is a schematic diagram illustrating a second interface of the first electronic device according to the embodiments of the disclosure.

Referring to FIG. 4, FIG. 4 is a schematic diagram illustrating a second interface of the first electronic device according to the embodiments of the disclosure. As illustrated in FIG. 4, the first electronic device is the smart computer, and the interface A of the first electronic device may display a minimized display interface B' of the second electronic device through screen projection. The minimized display interface B' of the second electronic device may be displayed, through screen projection, on the interface A of the first electronic device at a fixed position (immovable); alternatively, the minimized display interface B' of the second electronic device may be displayed, through screen projection, on the interface A of the first electronic device at a dynamic position (movable).

In the embodiments, a target storage area for storing target content may be preset in the second electronic device. The target content may be newly generated or newly produced (added) content in the second electronic device. That is, the target storage area may be a preset storage area for storing newly added content in the second electronic device.

As a manner, the target content may include newly generated or newly produced rich media content in the second electronic device, and the second electronic device may set a target storage area for storing the newly added rich media content in advance. The newly generated or newly produced rich media content may include, but is not limited to: a newly added screenshot, newly added screen recording, a newly added image from a camera, a newly added video from the camera, and a newly added saved file.

As another manner, the target content may include newly generated or newly produced clipboard content in the second electronic device, and the second electronic device may set a target storage area for storing the newly added clipboard content in advance. The newly generated or newly produced clipboard content may include, but is not limited to: clipboard content generated or produced based on a copy operation for the interface content of the second electronic device, or clipboard content generated or produced based on a cut operation for the interface content of the second electronic device.

In some implementations, the second electronic device may monitor whether target content is newly added to the target storage area of the second electronic device. For example, the second electronic device may monitor whether new rich media content and/or clipboard content is added to the target storage area of the second electronic device. As a manner, the second electronic device may monitor, in real-time, whether the target content is newly added to the target storage area; or the second electronic device may monitor, at a preset time interval, whether the target content is newly added to the target storage area; or the second electronic device may monitor, at a preset point in time, whether the target content is newly added to the target storage area. The second electronic device may monitor, based on other preset rules, whether the target content is newly added to the target storage area. In some implementations of the embodiments, the second electronic device may monitor, in real-time, whether the target content is newly added to the target storage area, so as to synchronize the target content to the first electronic device in real-time.

In the embodiments, the second electronic device may generate the target message carrying the target content, in response to detecting that the target content is newly added to the target storage area of the second electronic device. The target message carrying the target content may be generated by: associating the target content with other content in the target message, or packaging the target content and the other content in the target message, which is not limited herein. In some implementations, the other content refers to information related to the target content.

At S120, the second electronic device transmits the target message to the first electronic device.

In the embodiments, after the second electronic device generates the target message carrying the target content, the second electronic device may transmit the target message to the first electronic device. The second electronic device may transmit the target message to the first electronic device through WLAN. As a manner, when the target message is formed by associating the target content with other content in the target message, the target content and the other content in the target message, that have been associated with each other, may be transmitted to the first electronic device separately. As another manner, when the target message is formed by packaging the target content and the other content in the target message, a packaged data packet may be transmitted to the first electronic device.

In some embodiments, the second electronic device may encrypt the target message and transmit the encrypted target message to the first electronic device.

At S130, the first electronic device displays a notification for the target message on the first electronic device, in which the notification is used to prompt for an operation of processing the target content on the first electronic device.

In the embodiments, after receiving the target message, the first electronic device may display the notification for the target message, in which the notification is used to prompt for an operation of processing the target content on the first electronic device. As a manner, after receiving the target message, the first electronic device may identify the target message to determine a type of the target content carried by the target message, and obtain and display a notification corresponding to the type.

In some implementations, when the target content is the rich media content, a notification for the rich media content may be displayed on the first electronic device, thereby prompting for an operation of processing the rich media content on the first electronic device. For example, the notification is used to prompt for an operation of copying the rich media content, saving the rich media content, opening the rich media content, generating a file based on the rich media content, etc., on the first electronic device, which is not limited herein.

As a manner, it is illustrated by taking a case where the target content is the rich media content as an example. A central controller of the first electronic device may register an event callback for the newly added rich media content with a file manager of the second electronic device, and the file manager of the second electronic device monitors whether new rich media content is added to the target storage area configured for the rich media content. In response to detecting that new rich media content is added to the target storage area configured for the rich media content, the file manager of the second electronic device triggers the event callback (uri carrying the newly added rich media content). The target message carrying the rich media content is transmitted to the first electronic device through a central controller of the second electronic device. The first electronic device may display the corresponding notification based on the rich media content.

In some implementations, when the target content is the clipboard content, a notification for the clipboard content may be displayed on the first electronic device, thereby prompting for an operation of processing the clipboard content on the first electronic device. For example, the notification is used to prompt for an operation of pasting the clipboard content on the first electronic device.

As a manner, it is illustrated by taking a case where the target content is the clipboard content as an example. The central controller of the first electronic device may register an event callback for a clipboard change with a system of the second electronic device, and the system of the second electronic device monitors whether a clipboard change occurs on the clipboard. In response to detecting the clipboard change, the system of the second electronic device triggers the event callback carrying the clipboard content. The target message carrying the clipboard content is transmitted to the first electronic device through a central controller of the second electronic device. The first electronic device may display the corresponding notification based on the clipboard content.

In the content collaboration method according to the embodiments of the disclosure, content systems of two electronic devices are enabled to be communicated with each other, and newly added content on one of the electronic devices can be synchronized in real-time to the other electronic device, so that a user can conveniently acquire the newly added content on the other electronic device, which improves the efficiency of processing the content across terminals.

Figure 5:
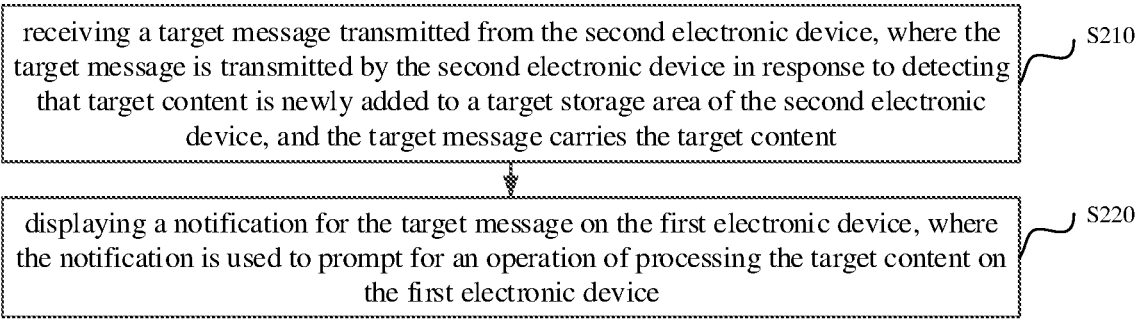
FIG. 5 is a flowchart of the content collaboration method according to an embodiment of the disclosure.

Referring to FIG. 5, FIG. 5 is a flowchart of the content collaboration method according to an embodiment of the disclosure. The method is applied to the above-mentioned first electronic device. Details for the process illustrated in FIG. 5 will be provided below. In the embodiment, the first electronic device is connected with a second electronic device through short-range communication. The content collaboration method may specifically include operations as follows.

At S210, a target message transmitted from the second electronic device is received, where the target message is transmitted by the second electronic device in response to detecting that target content is newly added to a target storage area of the second electronic device, and the target message carries the target content.

At S220, a notification for the target message is displayed on the first electronic device, where the notification is used to prompt for an operation of processing the target content on the first electronic device.

Detailed description of S210 to S220 may refer to S110 to S130, which will not be repeated herein.

In the content collaboration method according to the embodiments of the disclosure, content systems of two electronic devices are enabled to be communicated with each other, and newly added content on one of the electronic devices can be synchronized in real-time to the other electronic device, so that a user can conveniently acquire the newly added content on the other electronic device, which improves the efficiency of processing the content across terminals.

Figure 6:
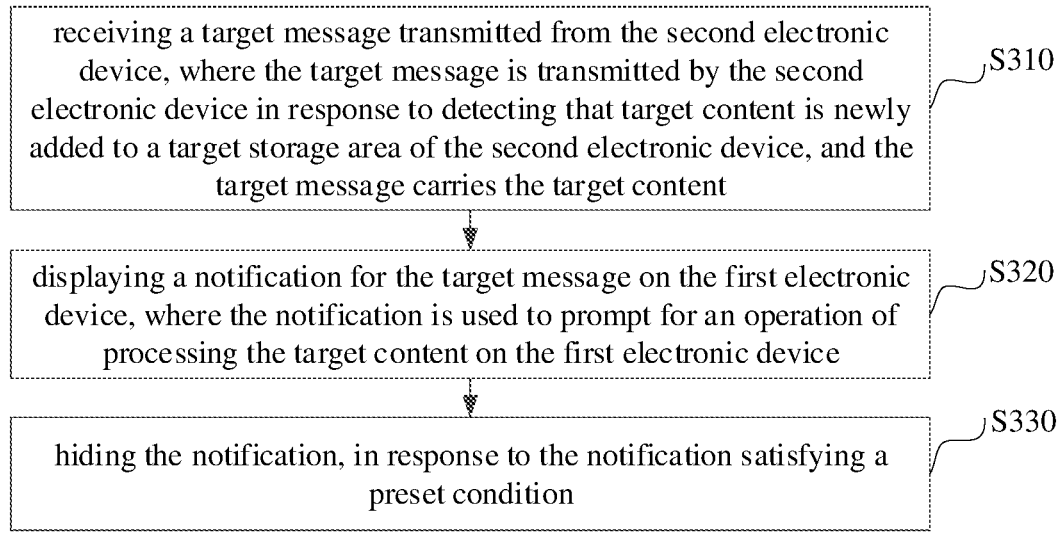
FIG. 6 is a flowchart of the content collaboration method according to another embodiment of the disclosure.

Referring to FIG. 6, FIG. 6 is a flowchart of the content collaboration method according to another embodiment of the disclosure. The method is applied to the above-mentioned first electronic device. Details for the process illustrated in FIG. 6 will be provided below. In the embodiment, the first electronic device and the second electronic device are connected through short-range communication. The content collaboration method may specifically include operations as follows.

At S310, a target message transmitted from the second electronic device is received, where the target message is transmitted by the second electronic device in response to detecting that target content is newly added to a target storage area of the second electronic device, and the target message carries the target content.

At S320, a notification for the target message is displayed on the first electronic device, where the notification is used to prompt for an operation of processing the target content on the first electronic device.

Detailed description of S310 to S320 may refer to S110 to S130, which will not be repeated herein.

At S330, the notification is hidden, in response to detecting a preset condition being satisfied.

In some implementations, the first electronic device may preset and store the preset condition, and the preset condition is used to determine whether or not to display the notification on the first electronic device. Therefore, in the embodiment, during the process of displaying the notification on the first electronic device, the first electronic device may detect whether the notification satisfies the preset condition. In response to detecting that the notification satisfies the preset condition, the notification may be hidden on the first electronic device. For example, the notification may be minimized on the first electronic device, or the notification may be deleted on the first electronic device, or the notification may be covered by other information on the first electronic device, which is not limited herein. In response to detecting that the notification does not satisfy the preset condition, the notification may be continuously displayed on the first electronic device until the notification meets the preset condition.

As a way, the preset condition being satisfied includes that a display duration of the notification reaches a preset duration. For example, the preset duration may be 5 seconds, or 10 seconds, which is not limited herein. Based on this, in the embodiment, once the first electronic device starts to display the notification, the first electronic device may start the time to obtain the display duration during which the notification is displayed. The first electronic device may compare the display duration of the notification with the preset duration, so as to determine whether the display duration of the notification reaches the preset duration. When the display duration of the notification reaches the preset duration, it may be determined that the notification satisfies the preset condition, and the notification may be hidden on the first electronic device. When the display duration of the notification does not reach the preset duration, it may be determined that the notification does not satisfy the preset condition, and the first electronic device may continue displaying the notification until the notification satisfies the preset condition. In some implementations, when no instruction for processing the notification is received until the display duration of the notification reaches the preset duration, it is determined that the notification satisfies the preset condition, and the notification may be hidden on the first electronic device. When the instruction for processing the notification is received before the display duration of the notification reaches the preset duration, it is determined that the notification does not satisfy the preset condition, and the first electronic device may continue displaying the notification until the notification satisfies the preset condition.

As another manner, the preset condition being satisfied includes detecting a deletion operation performed on the notification. Based on this, in the embodiment, the first electronic device may detect an operation for the notification during the process of displaying the notification. When a deletion operation performed on the notification is detected, it may be determined that the notification satisfies the preset condition, and the notification may be hidden on the first electronic device. When no deletion operation for the notification is detected, it may be determined that the notification does not satisfy the preset condition, and the notification may be continuously displayed on the first electronic device until the notification satisfies the preset condition. In some implementations, when the first electronic device is a smart phone, the first electronic device may determine that the deletion operation performed on the notification is detected, in response to detecting a first target touch operation acting on the notification. The first target touch operation includes, but is not limited to: a single-finger click operation, a multi-finger click operation, a single-finger press operation, a multi-finger press operation, a single-finger slide operation, a multi-finger slide operation, and a single-finger long press operation, a multi-finger long press operation. In some implementations, when the first electronic device is a smart computer, the first electronic device may determine that the deletion operation performed on the notification is detected, in response to detecting that a mouse performs a long press on the notification and moves with a target moving operation. The target moving operation may include: a moving operation whose moving direction satisfies a preset moving direction, and/or a moving operation whose moving distance satisfies a preset moving distance.

As yet another way, the preset condition being satisfied includes detecting that the first electronic device is disconnected from the second electronic device. In the embodiment, the first electronic device may detect the connection between the first electronic device and the second electronic device during the process of displaying the notification. In response to detecting that the first electronic device is disconnected from the second electronic device, it may be determined that the notification satisfies the preset condition, and the notification may be hidden at the first electronic device. In response to detecting that the first electronic device and the second electronic device remain connected, it may be determined that the notification does not satisfy the preset condition, and the notification may be continuously displayed on the first electronic device until the notification satisfies the preset condition.

Compared with the content collaboration method illustrated in FIG. 5, in the content collaboration method according to another embodiment of the disclosure, the notification is hidden when the notification satisfies the preset condition, thereby attenuating the effect of displaying the notification on the first electronic device, and enhancing the sensory experience of the user.

Figure 7:
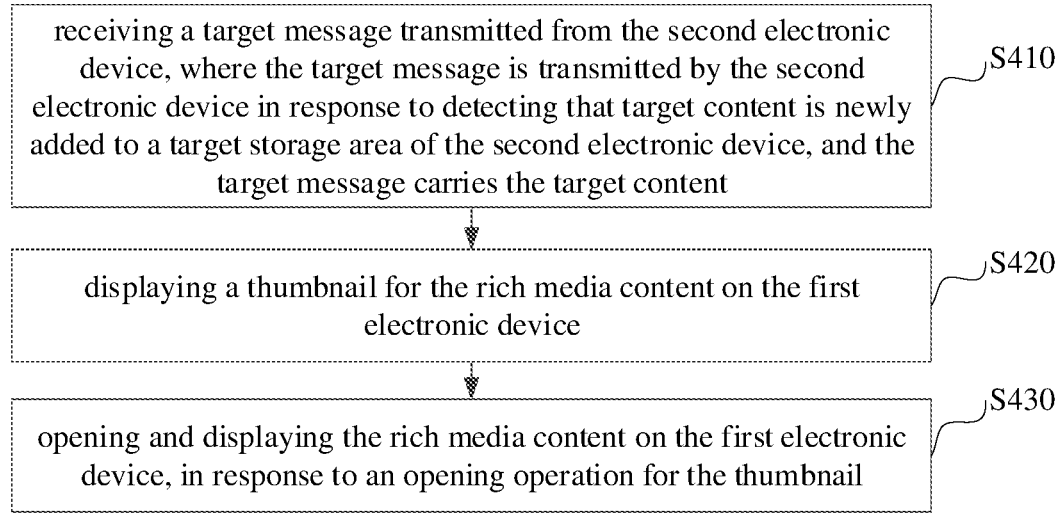
FIG. 7 is a flowchart of the content collaboration method according to yet another embodiment of the disclosure.

Referring to FIG. 7, FIG. 7 is a flowchart of the content collaboration method according to yet another embodiment of the disclosure. The method is applied in the above-mentioned first electronic device. Details for the process illustrated in FIG. 7 will be provided below. In the embodiment, the first electronic device is connected with a second electronic device through short-range communication. Target content includes rich media content, and target storage area includes a storage area configured for the rich media content. The content collaboration method may specifically include operations as follows.

At S410, a target message transmitted from the second electronic device is received, where the target message is transmitted by the second electronic device in response to detecting that target content is newly added to a target storage area of the second electronic device, and the target message carries the target content.

Detailed description of S410 may refer to S110 and S120, which will not be repeated herein.

At S420, a thumbnail for the rich media content is displayed on the first electronic device.

In the embodiment, the target content is the rich media content, and the target storage area includes the storage area configured for the rich media content.

In the embodiment, after receiving the target message carrying the rich media content, the first electronic device may display the thumbnail for the rich media content. The thumbnail is used to prompt for an operation of processing the rich media content on the first electronic device. As a way, after receiving the target message, the first electronic device may identify the target message to determine a type of the rich media content, obtain a thumbnail corresponding to the type, and display the thumbnail. For example, when the type of the rich media content is identified as a picture type or a video type, a thumbnail of the rich media content may be displayed; when the type of the rich media content is identified as a file type, a thumbnail corresponding to the rich media content (an icon reflecting the file type) and a file name may be displayed.

Figure 8:
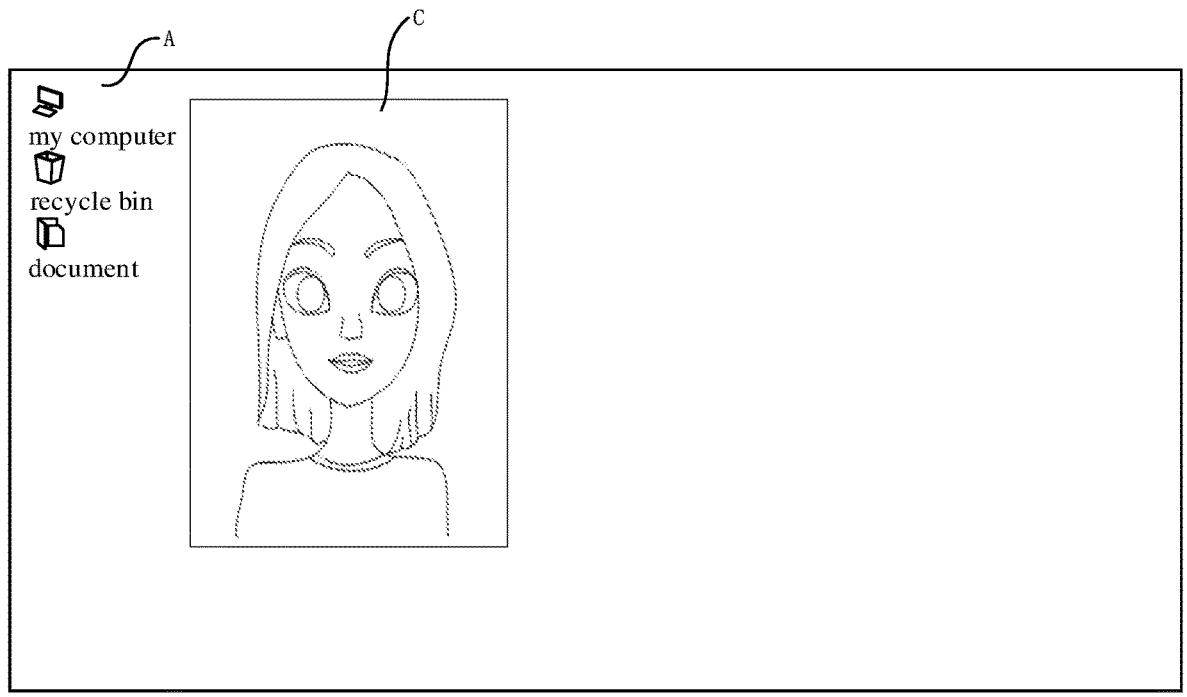
FIG. 8 is a schematic diagram illustrating a third interface of the first electronic device according to the embodiments of the disclosure.

Referring to FIG. 8, FIG. 8 is a schematic diagram illustrating a third interface of the first electronic device according to the embodiments of the disclosure. As illustrated in FIG. 8, when the target content is the rich media content (an image), a thumbnail C of the rich media content may be displayed on the interface A of the first electronic device.

At S430, the rich media content is opened and displayed on the first electronic device, in response to an opening operation for the thumbnail.

In some implementations, in the process of displaying the thumbnail, the first electronic device may detect an operation for the thumbnail. When an opening operation for the thumbnail is detected, in response to the opening operation for the thumbnail, the rich media content is opened and displayed on the first electronic device. It can be understood that, the rich media content may be opened and displayed by a local software of the first electronic device. For example, the local software of the first electronic device may be used to open and display a video, a picture, a file, etc., which is not limited herein.

In a way, when the first electronic device is a smart phone, the first electronic device may determine that the opening operation for the thumbnail is detected in response to detecting a second target touch operation for the thumbnail. The second target touch operation includes, but is not limited to: a single-finger click operation, a multi-finger click operation, a single-finger press operation, a multi-finger press operation, a single-finger slide operation, a multi-finger slide operation, and a single-finger long press operation, a multi-finger long press operation.

In another way, when the first electronic device is a smart computer, the first electronic device may determine that the opening operation for the thumbnail is detected, in response to detecting a mouse click operation acting on the thumbnail. The mouse click operation includes, but is not limited to a mouse single-click operation, and a mouse double-click operation.

Figure 9:
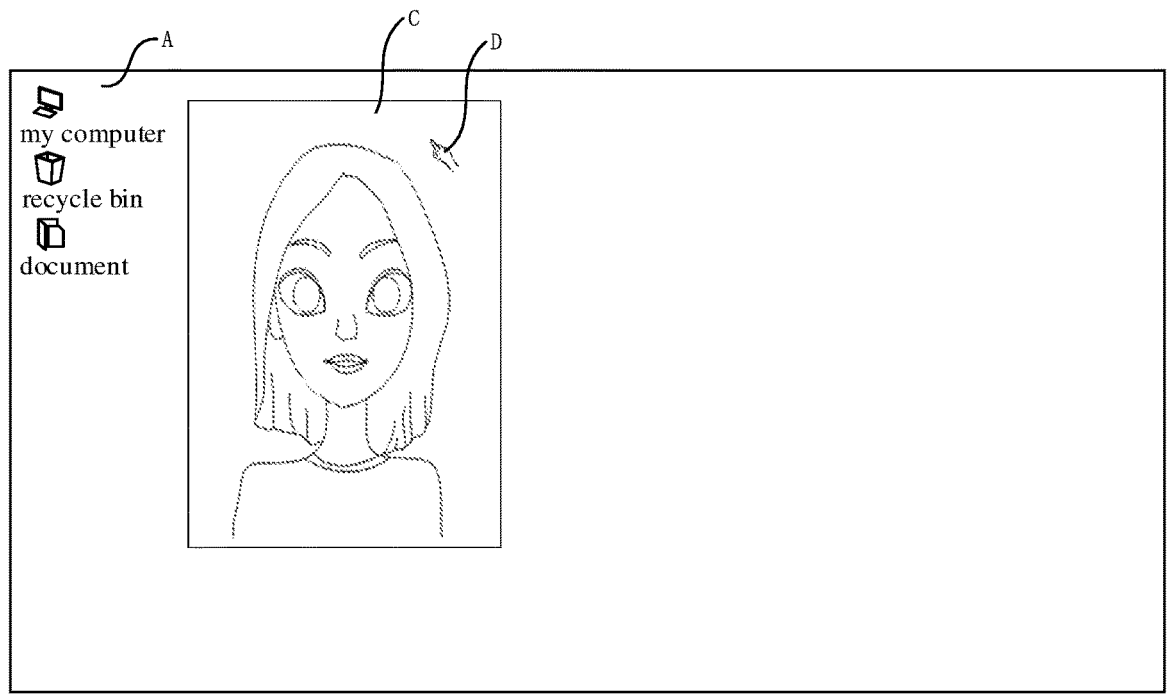
FIG. 9 is a schematic diagram illustrating a fourth interface of the first electronic device according to the embodiments of the disclosure.

Referring to FIG. 9, FIG. 9 is a schematic diagram illustrating a fourth interface of the first electronic device according to the embodiments of the disclosure. As illustrated in FIG. 9, the first electronic device is a smart computer, and the target content is the rich media content (an image). A mouse (which corresponds to a cursor) D may be used to click a thumbnail C of the rich media content that is displayed on the interface A of the first electronic device, so as to open the rich media content and display the rich media content on the first electronic device. When the mouse D is moved to the thumbnail C of the rich media content, an icon of the mouse is changed to a click style (such as a hand style illustrated in FIG. 9).

Compared with the content collaboration method illustrated in FIG. 5, in the content collaboration method according to yet another embodiment of the disclosure, the target content includes the rich media content, and the thumbnail for the rich media content may be displayed on the first electronic device, thereby improving the effect of synchronizing the rich media content between two devices. In addition, in the embodiment, the rich media content can be opened and displayed on the first electronic device, in response to the opening operation for the thumbnail, thereby improving the efficiency of processing the rich media content on the first electronic device.

Figure 10:
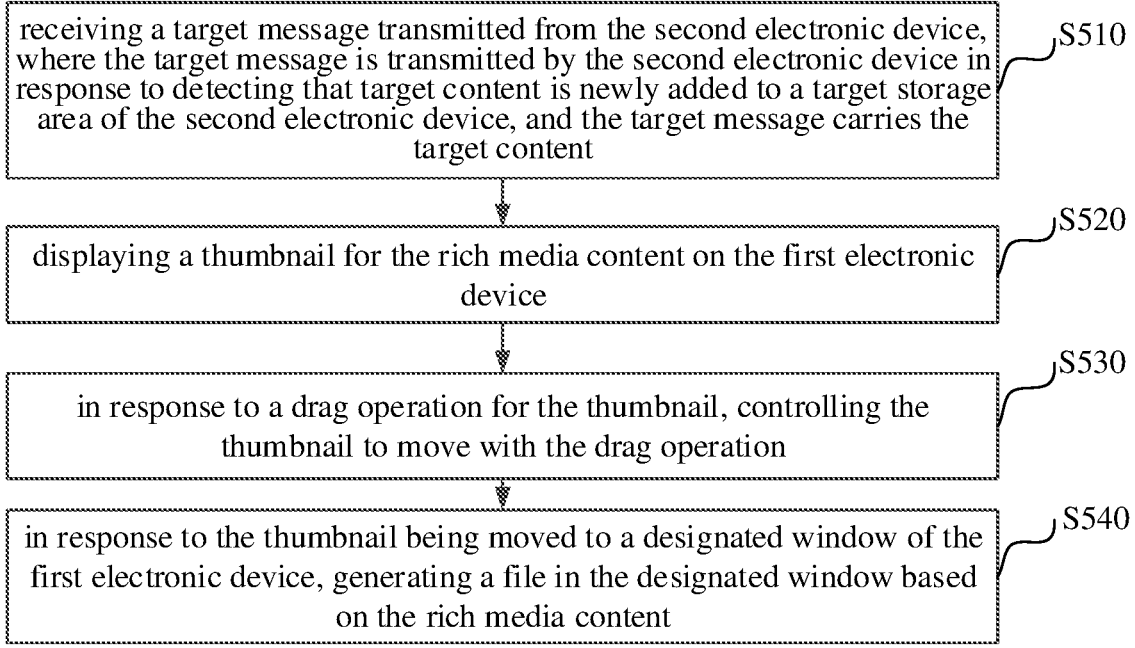
FIG. 10 is a flowchart of the content collaboration method according to still another embodiment of the disclosure.

Referring to FIG. 10, FIG. 10 is a flowchart of the content collaboration method according to still another embodiment of the disclosure. The method is applied to the above-mentioned first electronic device. Details for the process illustrated in FIG. 10 will be provided below. In the embodiment, the first electronic device is connected with a second electronic device through short-range communication. Target content includes rich media content, and target storage area includes a storage area configured for the rich media content. The content collaboration method may specifically include operations as follows.

At S510, a target message transmitted from the second electronic device is received, where the target message is transmitted by the second electronic device in response to detecting that target content is newly added to a target storage area of the second electronic device, and the target message carries the target content.

Detailed description of S510 may refer to S110 and S120, which will not be repeated herein.

At S520, a thumbnail for the rich media content is displayed on the first electronic device.

In the embodiment, the target content is the rich media content, and the target storage area includes a storage area configured for the rich media content.

In some implementations, after receiving the target message carrying the rich media content, the first electronic device may display the thumbnail for the rich media content. The thumbnail is used to prompt for an operation of processing the rich media content on the first electronic device. As a way, after receiving the target message, the first electronic device may identify the target message to determine a type of the rich media content, obtain a thumbnail corresponding to the type, and display the thumbnail. For example, when the type of the rich media content is identified as a picture type or a video type, a thumbnail of the rich media content may be displayed; when the type of the rich media content is identified as a file type, a thumbnail corresponding to the rich media content (an icon reflecting the file type) and a file name may be displayed.

At S530, in response to a drag operation for the thumbnail, the thumbnail is controlled to move with the drag operation.

In some implementations, during the process of displaying the thumbnail, the first electronic device may detect an operation for the thumbnail. When the first electronic device detects the drag operation for the thumbnail, the thumbnail is controlled, in response to the drag operation for the thumbnail, to move with the drag operation. For example, when the drag operation moves a distance N1 in a first direction, the thumbnail is controlled to move the distance N1 in the first direction with the drag operation; and when the drag operation moves a distance N2 in a second direction, the thumbnail is controlled to move the distance N2 in the second direction with the drag operation.

At S540, in response to the thumbnail being moved to a designated window of the first electronic device, a file is generated in the designated window based on the rich media content.

In some implementations, the first electronic device may preset the designated window, and the designated window is used as a determination basis for a position to which the thumbnail is dragged. Therefore, in the embodiment, during the process of controlling the thumbnail to move with the drag operation, it may be detected whether the thumbnail is moved to the specified window. When it is detected that the thumbnail is moved to the specified window, the file is generated in the designated window based on the rich media content, so as to improve the efficiency of generating the file.

As a way, in the process of controlling the thumbnail to move with the drag operation, it may be detected whether the drag operation ends, and it may be further detected whether the thumbnail is moved to the specified window in response to detecting that the drag operation ends. In response to detecting that the thumbnail is moved to the designated window when the drag operation ends, the file may be generated, based on the rich media content, in the designated window, thereby improving the efficiency of generating the file.

As an implementation, when a left mouse button is pressed, the icon of the mouse may be changed to a dragging style, indicating that the thumbnail may be dragged to move at this time; when the control thumbnail is moved with the drag operation, other elements (such as a first operable control and a second operable control) are not displayed, indicating that the thumbnail is being dragged; and the file is generated, when the drag operation is completed (the thumbnail is dragged to the specified window).

Figure 11:
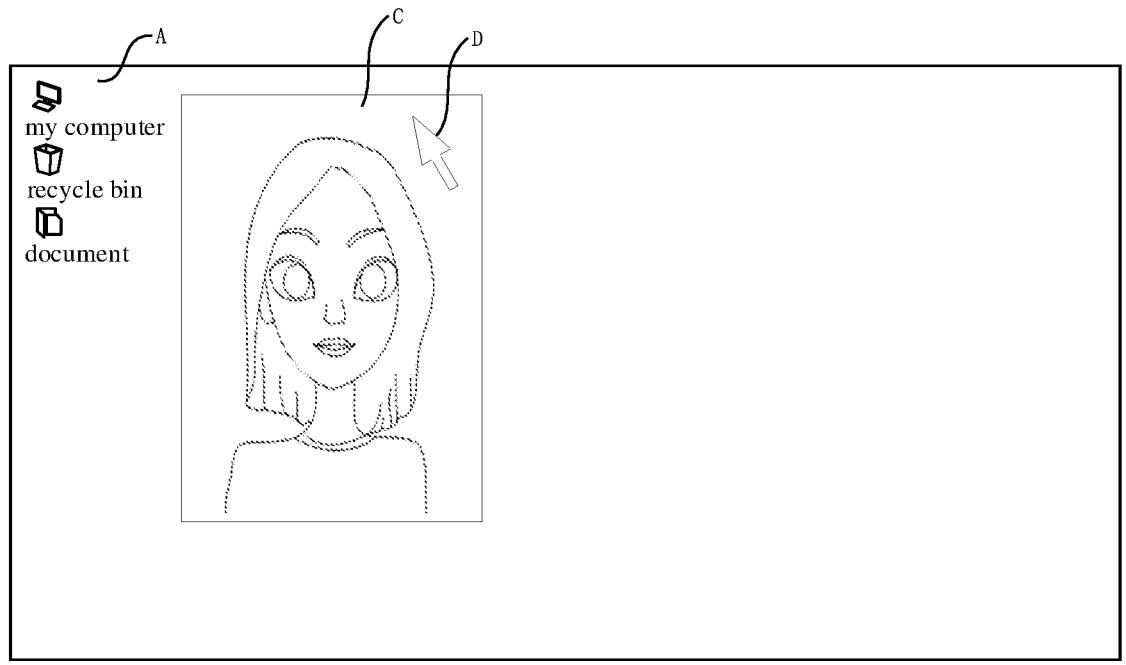
FIG. 11 is a schematic diagram illustrating a fifth interface of the first electronic device according to the embodiments of the disclosure.
Figure 12:
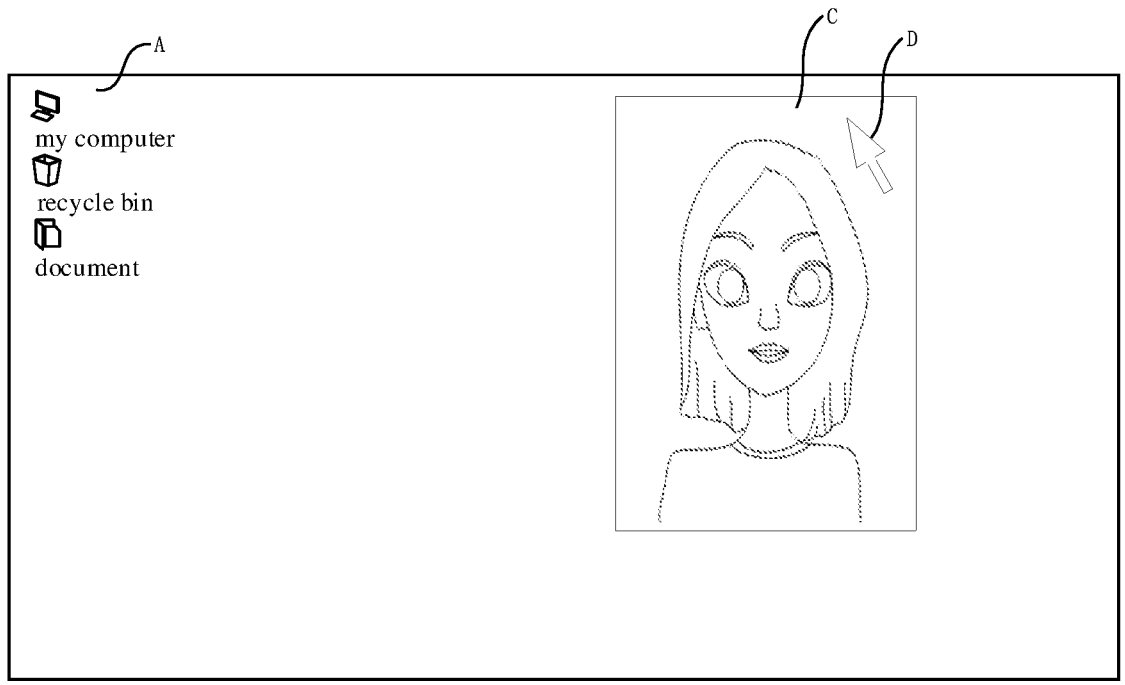
FIG. 12 is a schematic diagram illustrating a sixth interface of the first electronic device according to the embodiments of the disclosure.
Figure 13:
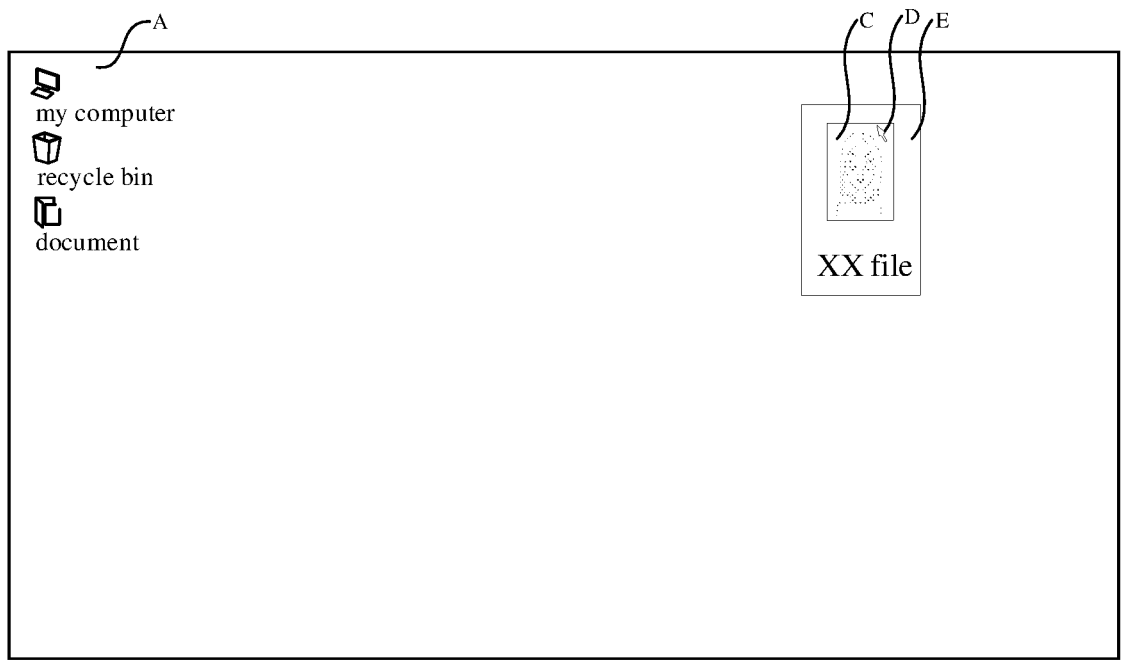
FIG. 13 is a schematic diagram illustrating a seventh interface of the first electronic device according to the embodiments of the disclosure.

Referring to FIG. 11 to FIG. 13, FIG. 11 is a schematic diagram illustrating a fifth interface of the first electronic device according to the embodiments of the disclosure, FIG. 12 is a schematic diagram illustrating a sixth interface of the first electronic device according to the embodiments of the disclosure, and FIG. 13 is a schematic diagram illustrating a seventh interface of the first electronic device according to the embodiments of the disclosure. As illustrated in FIG. 11, when the left mouse button is pressed, the icon of the mouse is changed to the dragging style (it is changed from the style of FIG. 9 to the style of FIG. 11), and the thumbnail C of the rich media content may be controlled to move on the interface A of the first electronic device (a change from FIG. 11 to FIG. 12). When the drag operation is completed, a file E may be generated (as illustrated in FIG. 13).

Compared with the content collaboration method illustrated in FIG. 5, in the content collaboration method according to still another embodiment of the disclosure, the target content includes the rich media content, and the thumbnail for the rich media content may be displayed on the first electronic device, thereby improving the effect of synchronizing the rich media content between two devices. In addition, in the embodiment, in response to the drag operation for the thumbnail, the thumbnail is controlled to move with the drag operation; and in response to the thumbnail being moved to the designated window of the first electronic device, the file is generated in the designated window based on the rich media content. In this way, the efficiency of generating the file is improved.

Figure 14:
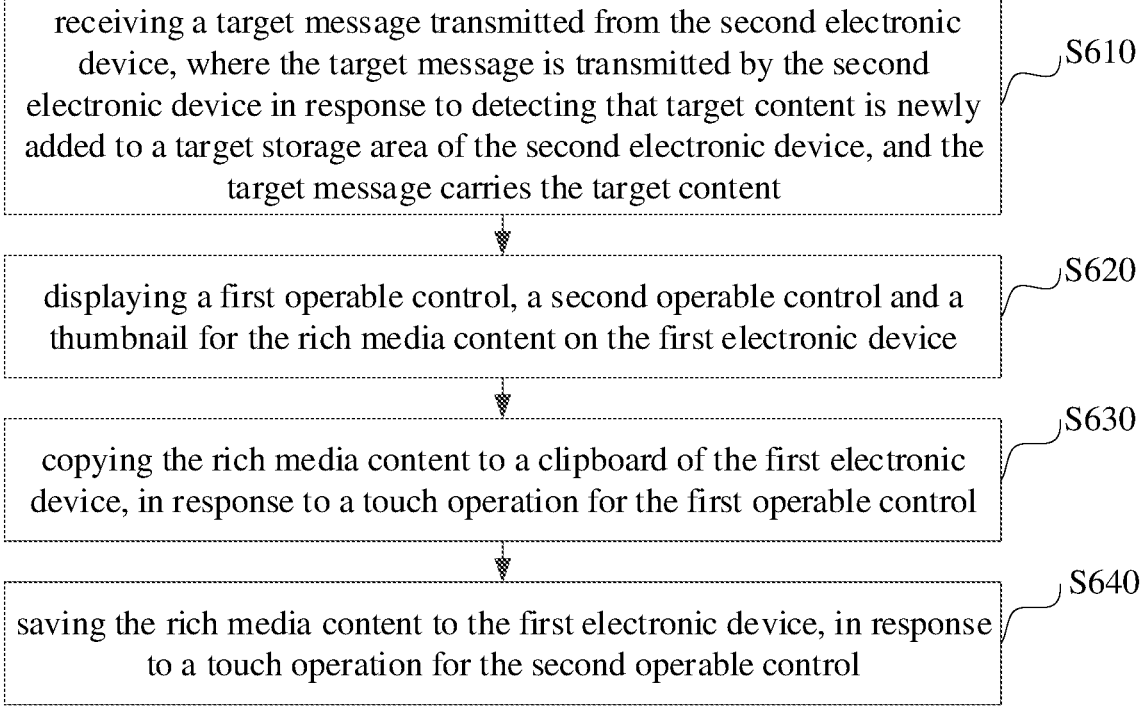
FIG. 14 is a flowchart of the content collaboration method according to still yet another embodiment of the disclosure.

Referring to FIG. 14, FIG. 14 is a flowchart of the content collaboration method according to still yet another embodiment of the disclosure. The method is applied to the above-mentioned first electronic device. Details for the process illustrated in FIG. 14 will be provided below. In the embodiment, the first electronic device is connected with a second electronic device through short-range communication. Target content includes rich media content, and target storage area includes a storage area configured for the rich media content. The content collaboration method may specifically include operations as follows.

At S610, a target message transmitted from the second electronic device is received, where the target message is transmitted by the second electronic device in response to detecting that target content is newly added to a target storage area of the second electronic device, and the target message carries the target content.

Detailed description of S610 may refer to S110 and S120, which will not be repeated herein.

At S620, a first operable control, a second operable control and a thumbnail for the rich media content are displayed on the first electronic device.

In the embodiment, the target content is the rich media content, and the target storage area includes a storage area configured for the rich media content.

In some implementations, after receiving the target message carrying the rich media content, the first electronic device may display the thumbnail for the rich media content, the first operable control and the second operable control. The thumbnail is used as a prompt for an operation of processing the rich media content at the first electronic device, the first operable control is used to perform first processing on the rich media content, and the second operable control is used to perform second processing on the rich media content. As a way, after receiving the target message, the first electronic device may identify the target message to determine a type of the rich media content, obtain a thumbnail corresponding to the type, and display the thumbnail. For example, when the type of the rich media content is identified as a picture type or a video type, a thumbnail of the rich media content, the first operable control and the second operable control may be displayed; when the type of the rich media content is identified as a file type, a thumbnail corresponding to the rich media content (an icon reflecting the file type), a file name, the first operable control and the second operable control may be displayed.

In some implementations, it is illustrated by taking the first electronic device being a smart computer as an example. The first electronic device may display the thumbnail for the rich media content after receiving the target message carrying the rich media content. In addition, the first electronic device calls out and displays the first operable control and the second operable control, in response to detecting that the mouse moves to the thumbnail for the rich media content. That is, whether the first operable control and the second operable control being displayed or not is determined based on a position of the mouse relative to the thumbnail for the rich media content.

At S630, the rich media content is copied to a clipboard of the first electronic device, in response to a touch operation for the first operable control.

In some implementations, the first operable control is used to perform a copy operation on the rich media content, so as to improve the efficiency of copying the rich media content. For example, the first operable control may be an operable control on which a word "copy" is displayed.

In the embodiment, the first electronic device may detect an operation for the first operable control, in the process of displaying the thumbnail and the first operable control. When the touch operation for the first operable control is detected, the first electronic device may copy, in response to the touch operation for the first operable control, the rich media content to the clipboard of the first electronic device.

As a way, when the rich media content is copied to the clipboard of the first electronic device, the rich media content may be synchronized to a clipboard of the second electronic device, that is, the clipboard of the second electronic device may also include the rich media content.

At S640, the rich media content is saved to the first electronic device, in response to a touch operation for the second operable control.

In some implementations, the second operable control is used to perform a save operation on the rich media content, so as to improve the efficiency of saving the rich media content. For example, the second operable control may be an operable control on which a word "save" is displayed.

In the embodiment, the first electronic device may detect an operation for the second operable control, in the process of displaying the thumbnail and the second operable control. When the touch operation for the second operable control is detected, the first electronic device may save, in response to the touch operation for the second operable control, the rich media content to the first electronic device. As a way, in response to detecting the touch operation for the second operable control, a save path selection box may be popped up, and upon selection of a saving path, the rich media may be saved to a corresponding path of the first electronic device.

Figure 15:
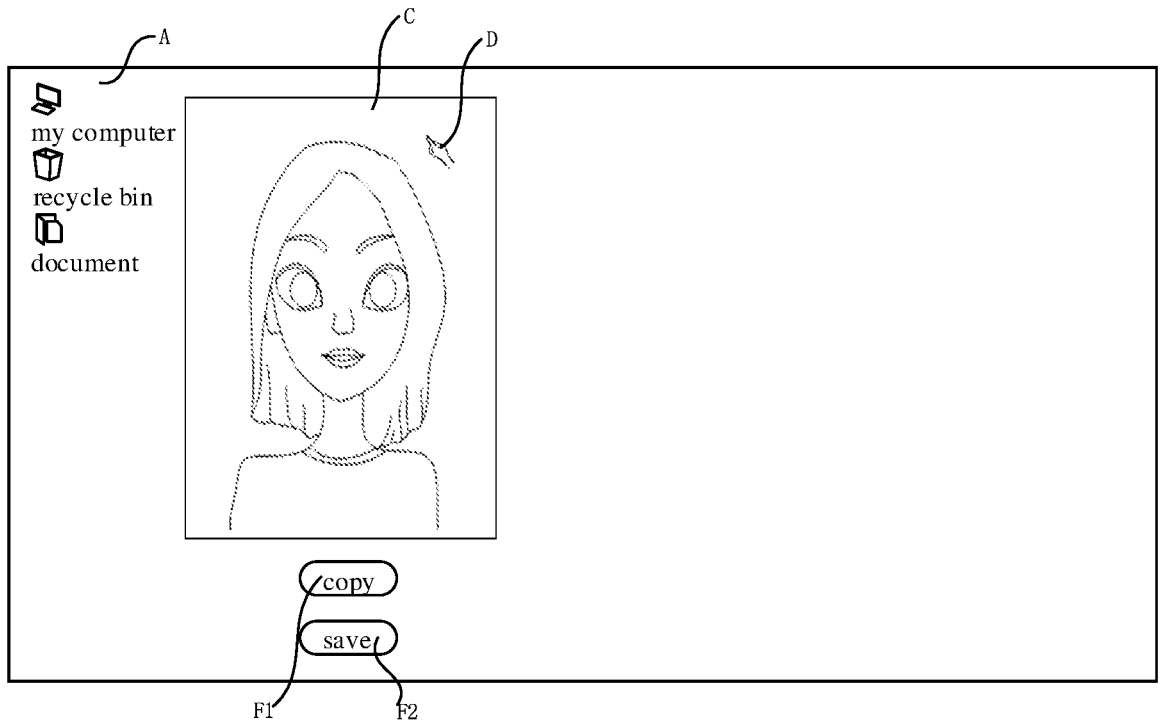
FIG. 15 is a schematic diagram illustrating an eighth interface of the first electronic device according to the embodiments of the disclosure.

Referring to FIG. 15, FIG. 15 is a schematic diagram illustrating an eighth interface of the first electronic device according to the embodiments of the disclosure. As illustrated in FIG. 15, when the target content is the rich media content (an image), a thumbnail C of the rich media content, a first operable control F1 and a second operable control F3 may be displayed on the interface A of the first electronic device.

As a way, when the left mouse button of the mouse D is pressed, the icon of the mouse D is changed to the drag style, and the thumbnail C of the rich media content can be controlled to move on the interface A of the first electronic device. During the movement, the first operable control F1 and the second operable control F3 may be hidden.

Compared with the content collaboration method illustrated in FIG. 5, in the content collaboration method according to the still yet another embodiment of the disclosure, the target content includes the rich media content, and the thumbnail for the rich media content may be displayed on the first electronic device, thereby improving the effect of synchronizing the rich media content between two devices. In addition, in the embodiment, the first operable control is provided for copying the rich media content, and the second operable control is provided for saving the rich media content, thereby improving the efficiency of copying and saving the rich media content.

Referring to FIG. 16, FIG. 16 is a flowchart of the content collaboration method according to still yet another embodiment of the disclosure. The method is applied to the above-mentioned first electronic device. Details for the process illustrated in FIG. 16 will be provided below. In the embodiment, the first electronic device is connected with the second electronic device based on short-range communication. Target content includes clipboard content, and target storage area includes a storage area configured for the clipboard content. The content collaboration method may specifically include operations as follows.

At S710, a target message transmitted from the second electronic device is received, where the target message is transmitted by the second electronic device in response to detecting that target content is newly added to a target storage area of the second electronic device, and the target message carries the target content.

At S720, first prompt information for the clipboard content is displayed on the first electronic device, where the first prompt information is used to prompt that a clipboard of the first electronic device has synchronized the clipboard content.

In the embodiment, the target content is the clipboard content, and the target storage area includes a storage area configured for the clipboard content.

In some implementations, after receiving the target information carrying the clipboard content, the first electronic device may display the first prompt information for the clipboard content. The first prompt information is used to prompt that the clipboard content has been synchronized to the clipboard of the first electronic device, so as to prompt for an operation of processing the clipboard content on the first electronic device. Therefore, when the clipboard of the second electronic device adds new clipboard content (that is added through a cut or copy operation), the clipboard of the first electronic device would synchronize the clipboard content, so that the content of the second electronic device may be directly pasted to the first electronic device, improving the efficiency of cross-terminal access to the content.

As a way, the first prompt information may include a prompt for the specific content synchronized to the clipboard and a source of the content synchronized to the clipboard.

Referring to FIG. 17, FIG. 17 is a schematic diagram illustrating a ninth interface of the first electronic device according to the embodiments of the disclosure. As illustrated in FIG. 17, the target content is the clipboard content, and first prompt information G may be displayed on an interface A of the first electronic device. The first prompt information includes the prompt for the specific content synchronized to the clipboard (1. No login account 2) and the source of the content synchronized to the clipboard (the clipboard content from the second electronic device).

Compared with the content collaboration method illustrated in FIG. 5, in the content collaboration method according to the still yet another embodiment of the disclosure, the target content includes the clipboard content, the prompt information for the clipboard content may be displayed on the first electronic device to prompt that the first electronic device has synchronized the clipboard content, thereby improving the effect of synchronizing the clipboard content between two devices.

Referring to FIG. 18, FIG. 18 is a flowchart of the content collaboration method according to still yet another embodiment of the disclosure. The method is applied to the above-mentioned second electronic device. Details for the process illustrated in FIG. 18 will be provided below. In the embodiment, a first electronic device is connected with the second electronic device based on short-range wireless communication. The content collaboration method may specifically include operations as follows.

At S810, in response to detecting that target content is newly added to a target storage area of the second electronic device, a target message carrying the target content is generated.

At S820, the target message is transmitted to the first electronic device, to instruct the first electronic device to display a notification for the target message, where the notification is used to prompt for an operation of processing the target content on the first electronic device.

Detailed description of S810 to S820 may refer to S110 to S130, which will not be repeated herein.

In the content collaboration method according to the still yet another embodiment of the disclosure, content systems of two electronic devices are enabled to be communicated with each other, and newly added content on one of the electronic devices can be synchronized in real-time to the other electronic device, so that a user can conveniently acquire the newly added content on the other electronic device, which improves the efficiency of processing the content across terminals.

Figure 19:
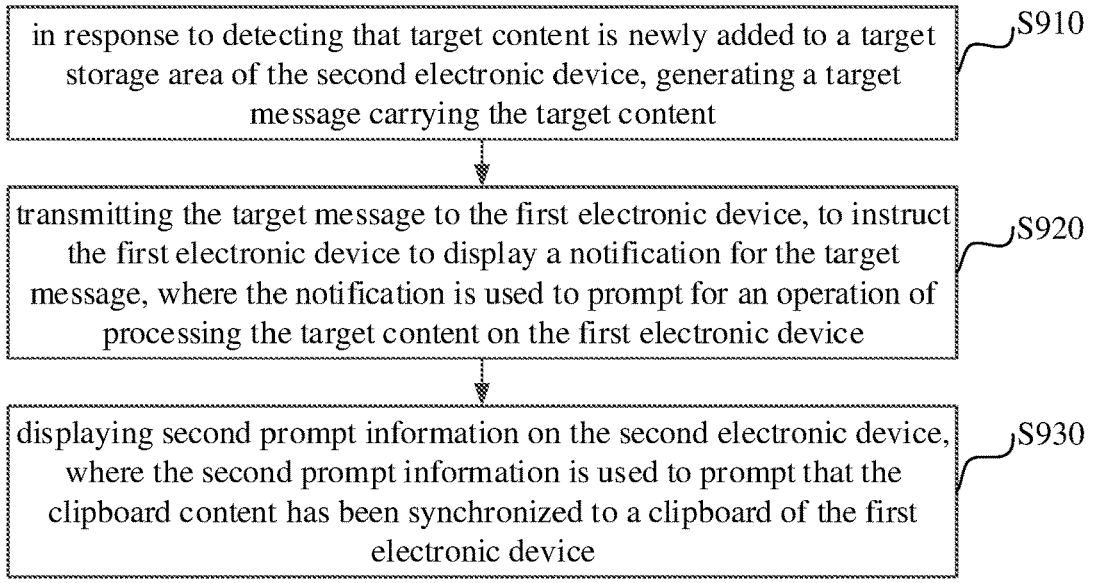
FIG. 19 is a flowchart of the content collaboration method according to still yet another embodiment of the disclosure.

Referring to FIG. 19, FIG. 19 is a flowchart of the content collaboration method according to a still yet another embodiment of the disclosure. The method is applied to the above-mentioned second electronic device. Details for the process illustrated in FIG. 19 will be provided below. In this embodiment, the second electronic device is connected with a first electronic device based on short-range wireless communication. Target content includes clipboard content, and target storage area includes a storage area configured for the clipboard content. The content collaboration method may specifically include operations as follows.

At S910, in response to detecting that target content is newly added to a target storage area of the second electronic device, a target message carrying the target content is generated.

At S920, the target message is transmitted to the first electronic device, so as to instruct the first electronic device to display a notification for the target message, where the notification is used to prompt for an operation of processing the target content on the first electronic device.

Detailed description of S910 to S920 may refer to S110 to S130, which will not be repeated herein.

At S930, second prompt information is displayed on the second electronic device, where the second prompt information is used to prompt that the clipboard content has been synchronized to a clipboard of the first electronic device.

In the embodiment, the target content is the rich media content, and the target storage area includes a storage area configured for the rich media content.

In some implementations, after the second electronic device transmits the target message to the first electronic device, the second prompt information may be displayed on the second electronic device. The second prompt information is used to prompt that the clipboard content has been synchronized to the clipboard of the first electronic device, so that the user can follow the progress of synchronizing the clipboard content in time.

In some implementations, the second electronic device may preset and store a preset condition for hiding, and the preset condition for hiding is used a determination basis for the displaying of the second prompt information on the second electronic device. Therefore, in the embodiment, during the process of displaying the second prompt information on the second electronic device, the second electronic device may detect whether the second prompt information satisfies the preset condition for hiding. In response to detecting that the second prompt information satisfies the preset condition for hiding, the second prompt information may be hidden on second electronic device. For example, the second prompt information may be minimized on the second electronic device, or the second prompt information may be deleted on the second electronic device, or the second prompt information may be covered by other information on the second electronic device, which is not limited herein. In response to detecting that the second prompt information does not satisfy the preset condition for hiding, the second electronic device may continue displaying the second prompt information until the second prompt information satisfies the preset condition for hiding.

As a way, the second prompt information may be hidden in response to a display duration of the second prompt information reaching a preset display duration. The preset display duration may be 3 seconds or 5 seconds, which is not limited herein.

Figure 20:
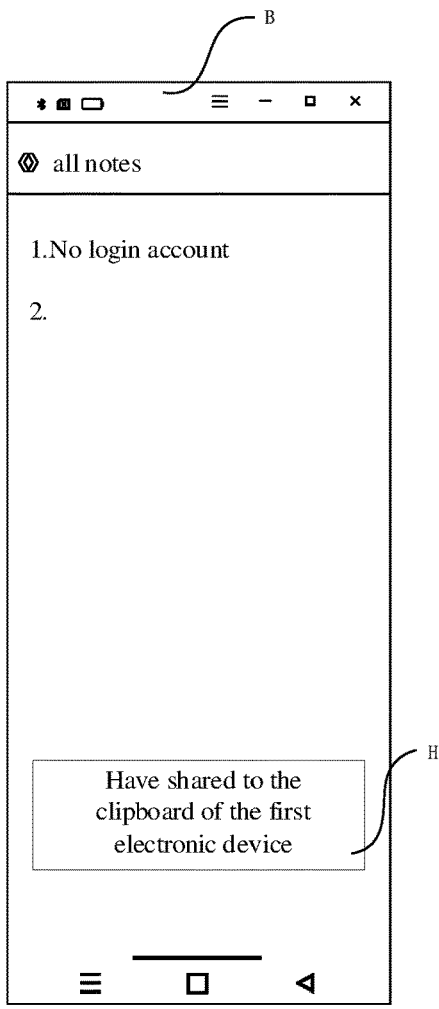
FIG. 20 illustrates a schematic diagram of an interface of a second electronic device according to the embodiments of the disclosure.

Referring to FIG. 20, FIG. 20 illustrates a schematic diagram of an interface of the second electronic device according to the embodiments of the disclosure. As illustrated in FIG. 20, the target content is the clipboard content, and second prompt information H may be displayed on a display interface B of the second electronic device, where the second prompt information H may present the wordings "Have shared to the clipboard of the first electronic device".

Compared with the content collaboration method illustrated in FIG. 18, in the content collaboration method according to this still yet another embodiment of the disclosure, the target content is the clipboard content, and when it is detected that target content is newly added to the target storage area of the second electronic device, the second prompt information is displayed on the second electronic device, so as to prompt that the clipboard content has been synchronized to the clipboard of the first electronic device, thereby improving the effect of collaborating the clipboard content.

Figure 21:
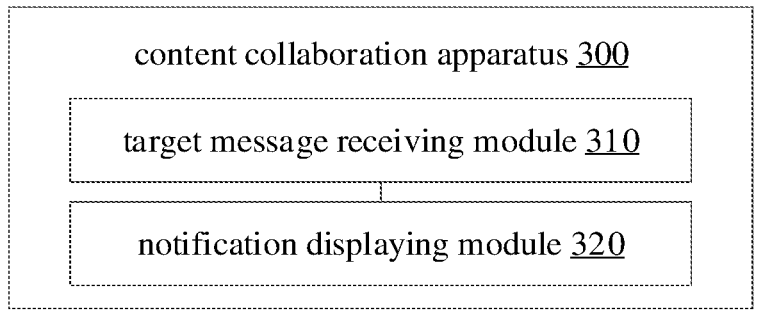
FIG. 21 is a block diagram illustrating modules of a content collaboration apparatus according to the embodiments of the disclosure.

Referring to FIG. 21, FIG. 21 is a block diagram of modules of a content collaboration apparatus according to an embodiment of the disclosure. The content collaboration apparatus 300 is implemented in the above-mentioned first electronic device. The block diagram illustrated in FIG. 21 will be described below. In the embodiment, the first electronic device is connected with a second electronic device through short-range wireless communication. The content collaboration apparatus 300 includes: a target message receiving module 310 and a notification displaying module 320.

The target message receiving module 310 is configured to receive a target message transmitted from the second electronic device, where the target message is transmitted by the second electronic device in response to detecting that target content is newly added to a target storage area of the second electronic device, and the target message carries the target content.

The notification displaying module 320 is configured to display a notification for the target message on the first electronic device, where the notification is used to prompt for an operation of processing the target content on the first electronic device.

Furthermore, the target content includes rich media content, the target storage area includes a storage area configured for the rich media content. The notification displaying module 320 includes a thumbnail displaying sub-module.

The thumbnail displaying sub-module is configured to display a thumbnail for the rich media content on the first electronic device.

Furthermore, the thumbnail displaying sub-module includes a thumbnail displaying unit, a rich media content copying unit, and a rich media content saving unit.

The thumbnail displaying unit is configured to display a first operable control, a second operable control and the thumbnail for the rich media content, on the first electronic device.

The rich media content copying unit is configured to copy, in response to a touch operation for the first operable control, the rich media content to a clipboard of the first electronic device.

The rich media content saving unit is configured to save, in response to a touch operation for the second operable control, the rich media content to the first electronic device.

Furthermore, the notification displaying module 320 further includes a rich media content opening sub-module.

The rich media content opening sub-module is configured to open and display the rich media content on the first electronic device, in response to an opening operation for the thumbnail.

Furthermore, the notification displaying module 320 further includes a movement controlling sub-module and a file generating sub-module.

The movement controlling sub-module is configured to control, in response to a drag operation for the thumbnail, the thumbnail to move with the drag operation.

The file generating sub-module is configured to generate, based on the rich media content, a file in a designated window, in response to the thumbnail being moved to the designated window of the first electronic device.

Furthermore, the target content includes clipboard content, and the target storage area includes a storage area configured for the clipboard content, and the notification displaying module 320 further includes a prompt information displaying sub-module.

The prompt information displaying sub-module is configured to display first prompt information for the clipboard content on the first electronic device, where the first prompt information is used to prompt that a clipboard of the first electronic device has synchronized the clipboard content.

Furthermore, the content collaboration apparatus 300 further include a notification hiding module.

The notification hiding module is configured to hide the notification, in response to the notification satisfying a preset condition.

Figure 22:
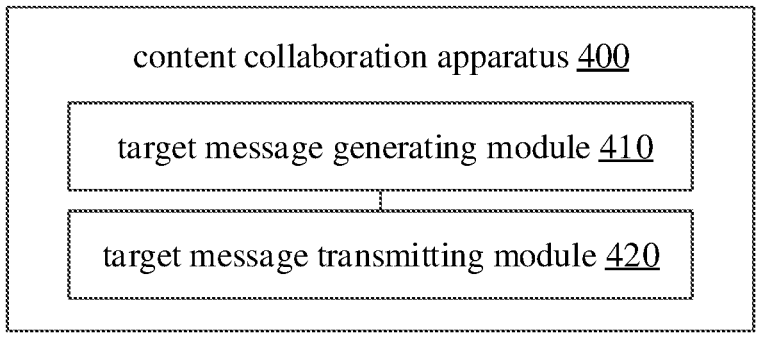
FIG. 22 is a block diagram illustrating modules of the content collaboration apparatus according to another embodiment of the disclosure.

Referring to FIG. 22, FIG. 22 is a block diagram of modules of a content collaboration apparatus according to another embodiment of the disclosure. The content collaboration apparatus 400 is implemented in the above-mentioned second electronic device. The block diagram illustrated in FIG. 23 will be described as follows. The content collaboration apparatus 400 includes a target message generating module 410 and a target message transmitting module 420.

The target message generating module 410 is configured to generate a target message carrying target content, in response to detecting that the target content is newly added to a target storage area of the second electronic device.

The target message transmitting module 420 is configured to transmit the target message to the first electronic device, to instruct the first electronic device to display a notification for the target message, where the notification is used to prompt for an operation of processing the target content on the first electronic device.

Those skilled in the art will clearly appreciate that, for the convenience and simplicity of the description, the specific operation processes of the above apparatus and modules can be referred to the corresponding processes in the above method embodiments and will not be repeated herein.

In the embodiments provided in the disclosure, a coupling between the modules may be electrical, mechanical, or in other forms.

Furthermore, various functional modules in the various embodiments of the disclosure may be integrated in one processing module, or each module may physically exist separately, or two or more modules may be integrated in a single module. The above integrated modules may be implemented either in the form of hardware or in the form of software functional modules.

Figure 23:
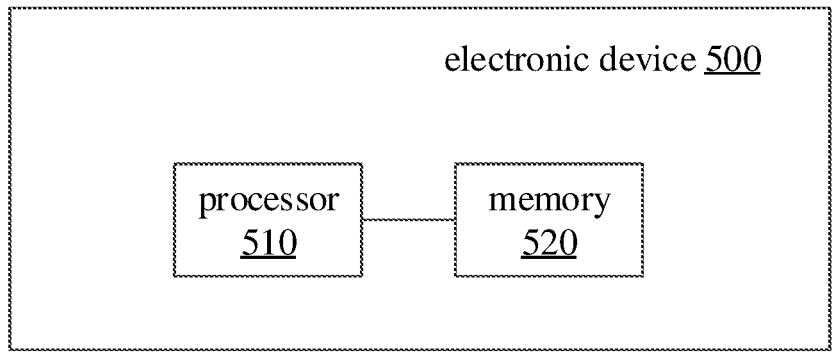
FIG. 23 is a block diagram of an electronic device for executing the content collaboration method according to the embodiments of the disclosure.

Referring to FIG. 23, FIG. 23 is a block diagram of an electronic device 500 according to the embodiments of the disclosure. The electronic device 500 may be the first electronic device 100 or the second electronic device 200, which is not limited herein. The electronic device 500 may be an electronic device capable of running programs, such as a smart phone, a tablet computer, and an e-book. The electronic device 500 in the embodiments of the disclosure may include one or more of the following components: a processor 510, a memory 520, and one or more programs. The one or more programs may be stored in the memory 520 and configured to be executed by one or multiple processors 510, and the one or more programs are configured to execute the methods described in the foregoing method embodiments.

The processor 510 may include one or more processing cores. The processor 510 may be connected to various parts of the entire electronic device 500 by using various interfaces and lines, and execute various functions of the electronic device 500 and process data, by running or executing instructions, programs, code sets, or instruction sets stored in the memory 520, and calling data stored in the memory 520. In some implementations, the processor 510 may be implemented in at least one hardware of a digital signal processing (DSP), a field-programmable gate array (FPGA), and a programmable logic array (PLA). The processor 510 may integrate one or more of a central processing unit (CPU), a graphics processing unit (GPU), and a modem. The CPU mainly handles an operating system, a user interface, an application, or the like. The GPU is configured to render and draw the content to be displayed. The modem is configured to handle wireless communication. It can be understood that the modem may also not be integrated into the processor 510, and may be realized by a single chip.

The memory 520 may include a random-access memory (RAM), and may also include a read-only memory (ROM). The memory 520 may be configured to store instructions, programs, codes, code sets, or instruction sets. The memory 520 may include a program storage area and a data storage area. The program storage area may store instructions for implementing the operating system, instructions for realizing at least one function (such as a touch control function, a voice playing function, and an image playing function), instructions for implementing the method embodiments, etc. The data storage area may also store data (e.g., phone book, audio/video data, chat log data) and the like created by the electronic device 500 in service.

Figure 24:
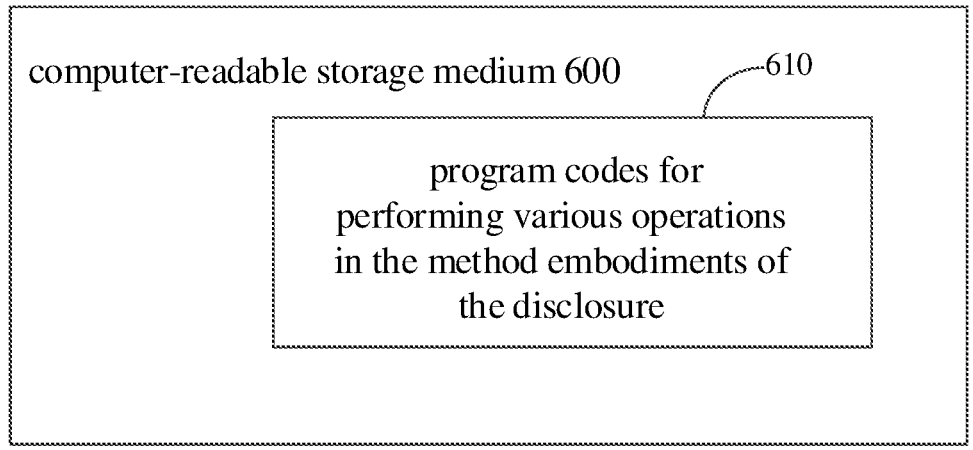
FIG. 24 is a diagram of a storage unit for storing or carrying program codes for realizing the content collaboration method according to the embodiments of the disclosure.

Referring to FIG. 24, FIG. 24 is a structural diagram of a non-transitory computer-readable storage medium according to the embodiments of the disclosure. The non-transitory computer-readable medium 600 has program codes stored thereon, and the program codes may be called by a processor to execute the method described in the above method embodiments.

The computer-readable storage medium 600 may be an electronic memory such as a flash memory, electrically erasable programmable read-only memory (EEPROM), EPROM, hard disk, or ROM. In some implementations, the computer-readable storage medium 600 includes a non-transitory computer-readable storage medium. The computer-readable storage medium 600 has a storage space for program codes 610 that perform any operation in the above methods. The program codes may be read from or written to one or more computer program products. The program codes 610 may be compressed, for example, in an appropriate form.

Based on the above, the embodiments of the disclosure provide the content collaboration method, the content collaboration apparatus, the electronic device, and the storage medium. A connection is established between two electronic devices through the short-range wireless communication. When it is detected that target content is newly added to the target storage area of one of the electronic devices, the target message carrying the target content is transmitted to the other electronic device. The other electronic device displays the notification for the target message, so as to prompt the user to process the target content on the other electronic device. In this way, the content systems of the two electronic devices are enabled to be communicated with each other, and the newly added content on one of the electronic devices can be synchronized in real-time to the other electronic device, so that the user can conveniently acquire the newly added content on the other electronic device, thereby improving the efficiency of processing the content across terminals.

Finally, it is notable that, the above embodiments are merely intended to illustrate but not to limit the technical solutions of the disclosure. Although the disclosure has been described in detail with reference to the foregoing embodiments, it can be understood that, those of ordinary skill in the art can modify the technical solutions described in the foregoing embodiments or make equivalent substitutions for some technical features therein. These modifications or substitutions do not drive the essence of the corresponding technical solutions away from the spirit and scope of the technical solutions of the embodiments of the disclosure.

What is claimed is:

1. A content collaboration method, wherein the method is implemented by a first electronic device, the first electronic device is connected with a second electronic device through short-range wireless communication, and the method comprises:
   receiving a target message transmitted from the second electronic device, wherein the target message is transmitted by the second electronic device in response to detecting that target content is newly added to a target storage area of the second electronic device, and the target message carries the target content; and
   displaying a notification for the target message on the first electronic device, wherein the notification is used to prompt for an operation of processing the target content on the first electronic device;
   wherein the target content comprises clipboard content, and the target storage area comprises a storage area configured for the clipboard content, and displaying the notification for the target message on the first electronic device comprises:
   displaying prompt information for the clipboard content on the first electronic device, wherein the prompt information is used to prompt that the clipboard content has been synchronized to a clipboard of the first electronic device.

2. The method as claimed in claim 1, wherein after displaying the notification for the target message on the first electronic device, the method further comprises:
   hiding the notification, in response to detecting that a preset condition is satisfied.

3. The method as claimed in claim 2, wherein the preset condition being satisfied comprises:
   a display duration of the notification reaches a preset duration; or
   a deletion operation is performed on the notification; or
   the first electronic device is disconnected from the second electronic device.

4. The method as claimed in claim 2, wherein hiding the notification comprises:
   minimizing the notification on the first electronic device; or
   deleting the notification on the first electronic device; or
   covering the notification by other information on the first electronic device.

5. The method as claimed in claim 1, wherein the target content further comprises rich media content, the target storage area further comprises a storage area configured for the rich media content, and displaying the notification for the target message on the first electronic device further comprises:
   displaying a thumbnail for the rich media content on the first electronic device.

6. The method as claimed in claim 5, wherein after displaying the thumbnail for the rich media content on the first electronic device, the method further comprises:
   opening and displaying the rich media content on the first electronic device, in response to an opening operation for the thumbnail.

7. The method as claimed in claim 5, wherein after displaying the thumbnail for the rich media content on the first electronic device, the method further comprises:
   controlling, in response to a drag operation for the thumbnail, the thumbnail to move with the drag operation; and
   in response to the thumbnail being moved to a designated window of the first electronic device, generating, based on the rich media content, a file in the designated window.

8. The method as claimed in claim 7, wherein generating, based on the rich media content, the file in the designated window in response to the thumbnail being moved to the designated window of the first electronic device, comprises:
   in response to detecting that the drag operation ends and the thumbnail is moved to the designated window of the first electronic device, generating, based on the rich media content, the file in the designated window.

9. The method as claimed in claim 5, wherein displaying the thumbnail for the rich media content on the first electronic device, comprises:
   displaying a first operable control, a second operable control and the thumbnail for the rich media content on the first electronic device; and
wherein the method further comprises:
   copying, in response to a touch operation for the first operable control, the rich media content to a clipboard of the first electronic device; or
   saving, in response to a touch operation for the second operable control, the rich media content to the first electronic device.

10. The method as claimed in claim 9, wherein saving, in response to the touch operation for the second operable control, the rich media content to the first electronic device, comprises:
   displaying a save path selection box, in response to the touch operation for the second operable control; and
   in response to a saving path being selected based on the save path selection box, saving the rich media content to the saving path of the first electronic device.

11. The method as claimed in claim 1, wherein displaying the notification for the target message on the first electronic device, comprises:
   acquiring a type of the target content carried in the target message; and
   obtaining a notification corresponding to the type of the target content, and displaying the notification corresponding to the type of the target content on the first electronic device.

12. A content collaboration method, wherein the method is implemented by a second electronic device, the second electronic device is connected with a first electronic device through short-range wireless communication, and the method comprises:
   in response to detecting that target content is newly added to a target storage area of the second electronic device, generating a target message carrying the target content; and
   transmitting the target message to the first electronic device, to instruct the first electronic device to display a notification for the target message, wherein the notification is used to prompt for an operation of processing the target content on the first electronic device;
   wherein the target content comprises clipboard content, and the target storage area comprises a storage area configured for the clipboard content, and after transmitting the target message to the first electronic device, the method further comprises:

displaying prompt information on the second electronic device, wherein the prompt information is used to prompt that the clipboard content has been synchronized to a clipboard of the first electronic device.

13. The method as claimed in claim 12, wherein after displaying the prompt information on the second electronic device, the method further comprises:

hiding the prompt information on the second electronic device, in response to the prompt information satisfying a preset condition for hiding.

14. The method as claimed in claim 12, wherein the method further comprises:

registering an event callback for a clipboard change with a system of the second electronic device; and
  triggering, in response to detecting a clipboard change occurring on the clipboard, the event callback carrying the clipboard content.

15. The method as claimed in claim 12, wherein transmitting the target message to the first electronic device, comprises:

encrypting the target message and transmitting an encrypted target message to the first electronic device.

16. An electronic device, comprising a memory and a processor, wherein the memory is coupled to the processor, the memory stores instructions which, when being executed by the processor, cause the processor to implement a content collaboration method, wherein the electronic device is connected with another electronic device through short-range wireless communication, and the method comprises:

receiving a target message, wherein the target message is transmitted by the another electronic device in response to detecting that there is new content in a target storage area of the another electronic device, and the target message carries the new content; and
  displaying a notification on the electronic device, wherein the notification is used to prompt for an operation of processing the new content on the electronic device;
  wherein the new content comprises clipboard content, and the target storage area comprises a storage area configured for the clipboard content, and displaying the notification on the electronic device comprises:
  displaying prompt information for the clipboard content on the electronic device, wherein the prompt information is used to prompt that the clipboard content has been synchronized to a clipboard of the electronic device.

17. The electronic device as claimed in claim 16, wherein the new content further comprises rich media content, the target storage area further comprises a storage area configured for the rich media content, and displaying the notification for the target message on the electronic device further comprises:

displaying a thumbnail for the rich media content on the electronic device.

18. The electronic device as claimed in claim 17, wherein after displaying the thumbnail for the rich media content on the electronic device, the method further comprises:

opening and displaying the rich media content on the electronic device, in response to an opening operation for the thumbnail; or,
  controlling, in response to a drag operation for the thumbnail, the thumbnail to move with the drag operation, and in response to the thumbnail being moved to a designated window of the electronic device, generating, based on the rich media content, a file in the designated window.

\* \* \* \* \*